Sept. 9, 1969  D. N. SHAW  3,465,953
COMPRESSOR LUBRICATION ARRANGEMENT
Filed Oct. 28, 1966
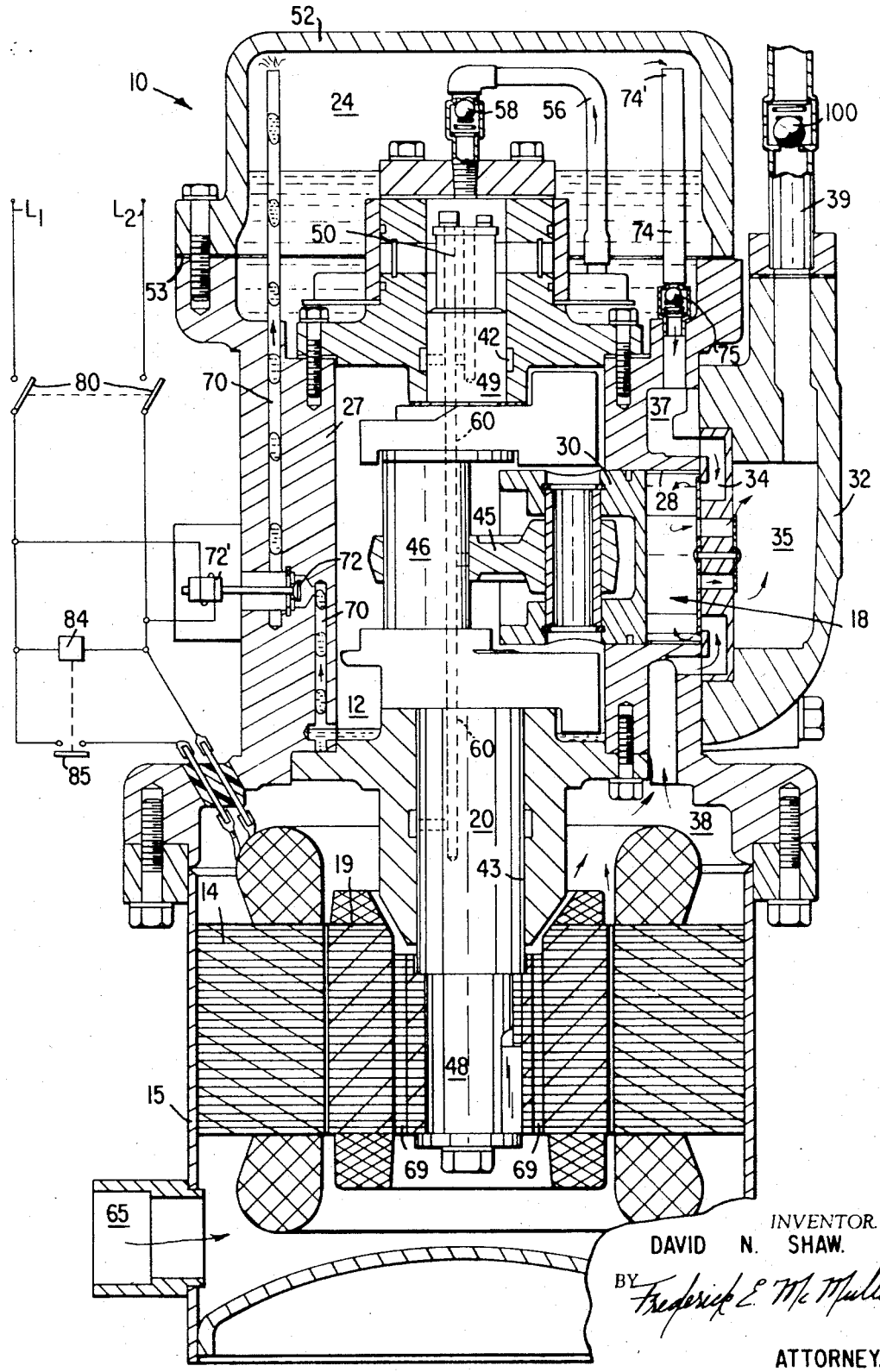
INVENTOR.
DAVID N. SHAW.
BY Frederick E. McMullen
ATTORNEY.

3,465,953
COMPRESSOR LUBRICATION ARRANGEMENT
David N. Shaw, Liverpool, N.Y., assignor to Carrier Corporation, Syracuse, N.Y., a corporation of Delaware
Filed Oct. 28, 1966, Ser. No. 590,289
Int. Cl. F04b 39/02, 35/04
U.S. Cl. 230—206      9 Claims

ABSTRACT OF THE DISCLOSURE

A lubrication arrangement for a reciprocating compressor in which the oil sump is separate from the compressor crankcase and means are provided to control pressures in the crankcase and oil sump to insure return of oil from the crankcase to the sump.

---

This invention relates to fluid compressors, and more particularly, to a lubrication arrangement for fluid compressors.

In fluid compressors, migration of the fluid being compressed into the lubricant while the compressor is shutdown can result in a breakdown in lubrication with resultant damage or destruction of the compressor when the compressor is run. This problem is particularly acute in refrigeration systems where the affinity of most refrigerants for lubricant at certain temperature and pressure conditions often results in "flooded" starts, that is, startup of the compressor with practically all of the refrigerant in the lubricant sump.

A widely used method for deterring the migration of refrigerant into the lubricant sump uses a heater to warm the lubricant sump while the compressor is stopped. However, sump or crankcase heaters are often too small to be effective and even where provided, may be used as for example during shipment of the unit.

It is a principal object of the present invention to provide a new and improved lubrication system for compressors.

It is a further object of the present invention to provide an improved lubrication system for a compressor having an oil storage sump in which the oil storage sump is effectively isolated from the remainder of the compressor apparatus on shutdown of the compressor.

It is an object of the present invention to provide a lubrication system for a compressor where the oil sump is separate from the compressor crankcase and means are provided to control pressures in the crankcase and oil sump to insure return of oil from the crankcase to the sump.

It is an object of the present invention to provide a lubrication system for compressors incorporating means to prevent depriming of the compressor oil pumping means when the compressor is started.

This invention relates to a fluid compressor having in combination compression means; a crankcase compartment; shaft means for driving the compression means; means for circulating lubricant to at least some points of frictional wear in the compressor, the lubricant being adapted to accumulate in the crankcase compartment; a sump for storing lubricant for the circulating means, the lubricant storing sump being separate from the crankcase compartment; and means for passing lubricant in the crankcase compartment to the sump, the lubricant passing means including means adapted to maintain operating pressures in the crankcase compartment above pressures in the lubricant sump to force lubricant from the crankcase compartment into the sump.

Other objects will be apparent from the ensuing description and drawings in which the figure is a sectional view of a fluid compressor incorporating the lubrication system of the present invention.

Referring to the drawing, there is shown a recriprocating compressor 10 incorporating the lubrication system of the present invention. While a reciprocating compressor is illustrated, it will be appreciated that the lubrication system of the present invention may be used with other types of compressors.

In the drawing, compressor 10 comprises a vertical unit with motor 14 thereof encased in housing 15 and compression means 18 above motor 14 and operatively connected to rotor 19 of motor 14 by crankshaft 20. Oil sump 24 of compressor 10 is above compression means 18. In this construction, motor housing 15 forms a base supporting compressor 10. It is understood compressor 10 may be a horizontal unit, and that the relative positions of motor 14, compression means 18 and sump 24 may be changed to suit individual designs.

Compression means 18 includes cylinder block 27 sealingly secured to motor housing 15 to form with housing 15 and sump cover 52 a hermetic or sealed unit. Cylinder block 27 has one or more cylinders 28 within which pistons 30 are movably disposed. Cylinder head 32, having valve controlled suction and discharge manifolds 34, 35 respectively, is suitably secured to cylinder block 27 opposite cylinder 28. Suction manifold 34 in cylinder head 32 connects with suction passage 37 in block 27. Passage 37 opens into motor compartment 38. Discharge manifold 35 in head 32 connects with discharge line 39. Check valve 100 in discharge line 39 prevents backflow of pressure fluid into compressor 10.

Cylinder block 27 has shaft journals 42, 43 therein supporting crankshaft 20 for rotation. Connecting rod 45 operatively connects eccentric 46 of crankshaft 20 with piston 30. The motor end 48 of crankshaft 20 projects through shaft journal 43 and is suitably fixed to rotor 19 of motor 14.

The pump end 49 of crankshaft 20 is operatively connected to a suitable oil circulating means such as pump 50. Pump 50 may be a centrifugal pump, or a positive displacement pump such as a gear or vane pump.

Cover 52 is tightly secured to upper face 53 of cylinder block 27 to form, in cooperation with cylinder block 27, oil sump 24. Oil pickup line 56 leads to the inlet of pump 50. Check valve 58 in line 56 prevents reverse flow of fluid through oil inlet line 56.

Oil from pump 50 flows through crankshaft feed passage 60 to the various points of frictional wear in compressor 10 such as crankshaft journals 42, 43, connecting rod 45, etc. Return oil accumulates in crankcase 12.

Opening 65 in motor housing 15 adjacent the base thereof communicates compressor 10 with the source of gas to be compressed, the entering gas passing through motor compartment 38 in and around motor 14 to cool motor 14, and through suction passage 37 and suction manifold 34 into cylinder 28. To facilitate flow of incoming gas and enhance motor cooling, motor rotor 19 is provided with series of gas passages 69 therein. Discharged gas passes through discharge manifold 35 into discharge line 39.

During operation of compressor 10, oil may accumulate in the bottom of motor compartment 38. The stream of suction gas passing through the motor compartment 38 enroute to compression means 18 carries the oil in motor compartment 38 through suction passage 37 and manifold 34 into cylinder 28. During the compression process, gas leakage or blow-by past the piston rings carries oil into crankcase 12.

Passage 70 between the lower portion of crankcase 12 and oil sump 24 serves as both a pressure gas bleed and oil return passage. Preferably, the upper terminus of passage 70 projects above the level of oil in sump 24. A solenoid powered valve 72 is provided to close passage 70 when compressor 10 is shutdown to prevent flow of pressure gas from compressor crankcase 12 into sump 24. Additionally, valve 72 serves to prevent depriming of oil pump 50 at startup of compressor 10 as will be more apparent hereinafter.

Passage 74 connects oil sump 24 with the low pressure or suction side of compressor 10, such as suction passage 37. Check valve 75 prevent reverse flow of pressure gas from suction manifold passage 37 through passage 74 into oil sump 24. Terminal end 74' of passage 74 is above the level of oil in sump 24 to prevent oil carryover into suction manifold passage 37.

Solenoid operator 72' of valve 72 is connected through control switch 80 to a suitable source of electrical energy designated for convenience by leads $L_1$, $L_2$. A suitable time delay mechanism 84 is also connected through control switch 80 to leads $L_1$, $L_2$. Contact 85 of the time delay mechanism 84 is series connected with the energizing windings of motor 14 and control switch 80 across leads $L_1$, $L_2$. As will be more apparent hereinafter, closure of control switch 80 completes energizing circuits to solenoid 72' and time delay mechanism 84. Following a predetermined time interval, contact 85 of time delay mechanism 84 closes to complete an energizing circuit to the windings of motor 14.

During operation of compressor 10, oil from pump 50 is distributed through crankshaft feed passage 60 to the several points of frictional wear within the compressor 10. Return oil accumulates in crankcase 12.

Pressures in crankcase 12 during operation of compressor 10, due principally to leakage or blow-by past piston 30, are greater than compressor suction pressures but less than compressor discharge pressures. During compressor operation, pressure gas in crankcase 12 bleeds through passage 70, oil sump 24, and passage 74 into suction passage 37. Because of the pressure loss in passages 70, 74 and valves 72, 75, pressures in oil sump 24 are greater than pressures in the suction manifold passage 37 and less than pressures in crankcase 12.

The pressure gas bleeding through passage 70 carries oil from crankcase 12 into oil sump 24. Should the level of oil in crankcase 12 cover passage 70, the ensuing pressure increase in crankcase 12 forces slugs of oil through passage 70 into oil sump 24.

When control switch 80 is opened and compressor 10 shutdown, solenoid 72' is deenergized permitting valve 72 to close the combination pressure bleed and oil return passage 70. Check valve 58 in conduit 56 prevents pressure gas in crankcase 12 from flowing back through the oil feed passage 60 and pump 50 into sump 24 to prevent migration of gas into sump 24. Additionally, check valve 58 prevents possible depriming of pump 50.

On shutdown of compressor 10, pressures on the suction side of the compressor normally rise. For example, where compressor 10 is part of a closed refrigeration system, following shutdown of compressor 10, pressures on the suction side of the compressor 10 rise as pressures in the system evaporator approach saturation. Check valve 75 closes passage 74 when pressures in suction passage 37 become greater than the pressure prevailing in oil sump 24. Valves 58, 72 and 75 therefore effectively isolate oil sump 24 and prevent the flow of pressure gas from compressor 10 into oil sump 24. The closure of oil sump 24 to the flow of pressure gas from crankcase 12 and from the suction side of the compressor following shutdown of the compressor prevents any migration of the fluid being compressed into the body of oil stored in the oil sump during the compressor off cycle, a phenomenon to which refrigeration systems are particularly susceptible. Additionally, a general equalization in pressures between oil sump 24 and the remainder of the compressor is prevented.

When compressor 10 is to be restarted, control switch 80 is closed to energize solenoid 72' and time delay mechanism 84. Solenoid 72' opens valve 72 permitting pressure gas in crankcase 12 to pass through passage 70 into oil sump 24 to equalize pressures between sump 24 and crankcase 12. By substantially equalizing pressures between sump 24 and crankcase 12 before startup of compressor 10 and operation of oil pump 50 possible depriming of oil pump 50 on startup of compressor 10 is prevented. Time delay mechanism 84 enforces the requisite relay to permit substantial pressure equalization between sump 24 and crankcase 12. Following a predetermined timed interval, contact 85 of time delay mechanism 84 is closed to energize the compressor motor 14 and start compressor 10.

While I have described a preferred mbodiment of my invention, it is to be understood that the invention is not limited thereto, but may be otherwise embodied within the scope of the following claims.

I claim:

1. In a fluid compressor including compression means, a crankcase compartment, and shaft means for driving said compression means, the combination of means for circulating lubricant to at least some points of frictional wear in said compressor, said lubricant being adapted to accumulate in said crankcase compartment; a sump for storing lubricant for said circulating means, said sump being separate from said crankcase compartment; and means for passing lubricant in said crankcase compartment to said sump, said lubricant passing means including means adapted to maintain operating pressures in said crankcase compartment above pressures in said lubricant sump to force lubricant from said crankcase compartment into said sump, said pressure maintaining means including means to bleed pressure gas from said crankcase compartment to the suction side of said compressor.

2. In a fluid compressor including compression means, a crankcase compartment, and shaft means for driving said compression means, the combination of means for circulating lubricant to at least some points of frictional wear in said compressor, said lubricant being adapted to accumulate in said crankcase compartment; a sump for storing lubricant for said circulating means, said sump being separate from said crankcase compartment; and means for passing lubricant in said crankcase compartment to said sump, said lubricant passing means including means adapted to maintain operating pressures in said crankcase compartment above pressures in said lubricant sump to force lubricant from said crankcase compartment into said sump, said lubricant passing means including first passage means between said crankcase compartment and said lubricant sump adapted to convey both lubricant and pressure gas in said crankcase compartment to said sump; and second passage means between said lubricant sump and said compressor suction side for conveying pressure gas from said sump to said compressor suction side.

3. A compressor according to claim 2 in which said lubricant circulating means has an inlet line communicating with said sump, and first valve control means adapted to prevent reverse flow of fluid through said circulating means inlet line to said sump.

4. A compressor according to claim 3 including second valve control means adapted to close said first passage means when said compressor is shutdown, and third valve control means adapted to prevent reverse flow of pressure gas from said suction manifold through said second passage means to said sump; said first, second and third valve control means cooperating to close said lubricant sump to the inflow of pressure fluid when said compressor is shutdown whereby migration of the fluid pumped to said lubricant sump when the compressor is shutdown is prevented.

5. A compressor according to claim 4 including control means for starting said compressor, said control means being adapted to first actuate said second valve control means to open said first passage means permitting pressure gas in said crankcase compartment to flow through said first passage means into said sump whereby pressures in said sump are raised and depriming of said lubricant circulating means on startup of said compressor is prevented, said control means including timing means effective to delay startup of said compressor for a predetermined timed interval following actuation of said second valve control means.

6. In a fluid compressor including compression means, a crankcase compartment, and shaft means for driving said compression means, the combination of means for circulating lubricant to at least some points of frictional wear in said compressor, said lubricant being adapted to accumulate in said crankcase compartment; a sump for storing lubricant for said circulating means, said sump being separate from said crankcase compartment; and means for passing lubricant in said crankcase compartment to said sump, said lubricant passing means including means adapted to maintain operating pressures in said crankcase compartment above pressures in said lubricant sump to force lubricant from said crankcase compartment into said sump, a motor drivingly secured to said shaft means, said compression means, motor, and lubricant sump being disposed in axial alignment one with another, said lubricant sump being above said compression means and motor.

7. A compressor according to claim 6 in which said compression means is between said lubricant sump and said motor.

8. In a fluid compressor with compression means including a crankcase compartment encasing the compression means running gear and shaft means for driving said compression means, the combination of means for circulating lubricant to at least some of the points of frictional wear in said compressor, said lubricant being adapted to accumulate in said crankcase compartment; a separate sump for storing lubricant for said circulating means; and means adapted on shutdown of said compressor to prevent ingress of pressure medium to said sump, said last mentioned means including first valve means for preventing backflow of pressure fluid from said crankcase compartment through said lubricant circulating means to said sump, first passage means for returning lubricant in said crankcase compartment to said sump, and second valve means adapted to close said first passage means on shutdown of said compressor, second passage means for bleeding pressure fluid from said sump into the suction side of said compressor, and third valve means for preventing backflow of pressure fluid from said compressor suction side through said second passage means to said sump.

9. In a fluid compressor with compression means including a crankcase compartment encasing the compression means running gear and shaft means for driving said compression means, the combination of means for circulating lubricant to at least some of the points of frictional wear in said compressor, said lubricant being adapted to accumulate in said crankcase compartment; a separate sump for storing lubricant for said circulating means; and means adapted on shutdown of said compressor to prevent ingress of pressure medium to said sump, control means adapted to communicate said sump with said crankcase compartment before startup of said compressor to permit pressures between said crankcase compartment and said sump to equalize whereby depriming of said lubricant circulating means at startup of said compressor is prevented.

References Cited
UNITED STATES PATENTS

| | | | |
|---|---|---|---|
| 2,618,430 | 11/1952 | Smith | 230—58 |
| 3,073,515 | 1/1963 | Neubauer et al. | 230—206 |

ROBERT M. WALKER, Primary Examiner

U.S. Cl. X.R.

230—58